Patented Mar. 20, 1928.

1,663,205

UNITED STATES PATENT OFFICE.

EDWARD LYONS, OF DETROIT, MICHIGAN, ASSIGNOR TO PARKE, DAVIS & COMPANY, OF DETROIT, MICHIGAN, A CORPORATION OF MICHIGAN.

ORGANIC MERCURY COMPOUND.

No Drawing.   Application filed November 12, 1923. Serial No. 674,388.

My invention relates to the preparation of a new series of compounds derived from mercury salts and certain organic compounds containing one or more carbonyl (CO) groups, such as succinimid, phthalimid, benzoic sulfinid (saccharin) etc. These new compounds are of especial utility for their germicidal, antiseptic and antisyphilitic properties and are usually obtained as soluble solids, which may be used for the preparation of tablets from which aqueous solutions of definite mercury content may be made. The compounds may also be used for making aqueous solutions directly, if it is so desired which are either neutral or slightly alkaline.

The mercury content in the various compounds may vary directly as the number of carbonyl groups present but in all of the various modifications the mercury is so combined that dilute cold solutions of acids or alkalies do not remove it and, therefore, the substances fail to give the usual ionic test for mercury with alkali, i. e. they do not precipitate mercuric oxide upon the addition of sodium or potassium hydroxide.

While other compounds of mercury and carbonyl derivatives, such as succinimid, phthalimid etc. have been prepared, they are known to be mercury-nitrogen linked bodies having the structural formula as follows:—

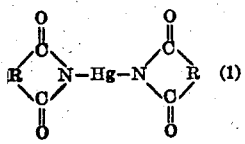

Such compounds respond to the ionic test for mercury with caustics such as sodium hydroxide, thereby breaking up the molecular structure.

The compounds herein described, however, differ radically from those of the type illustrated by formula 1 in that they are salts of metals, such as sodium, potassium etc. and their mercury content is considerably different. Furthermore, the mercury content always varies directly as the number of carbonyl groups present and it is probable that the mercury is linked directly to the carbonyl groups as shown for instance by the following structural formulas, wherein M represents Na or K, and R represents an organic radical:

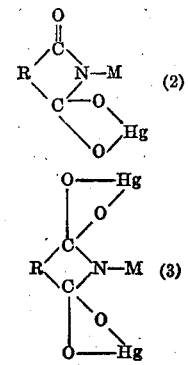

In the above formulas (2 and 3), it will be noted that the compounds contain one or more groups having the following probable structural formula:

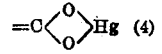

and this group appears to be characteristic of the new organic mercurial substances.

As an example of the preparation of a compound according to this invention, I will first describe the preparation of sodium mono-mercury phthalimid. One mole (147 grams) phthalimid is dissolved in a suitable amount of water containing three moles (120 grams) of sodium hydroxide or an equivalent amount (168 grams) potassium hydroxide and to this solution is added one mole (318 grams) of mercury acetate in aqueous solution. The reaction mixture is filtered and the clear filtrate is poured into ethyl or methyl alcohol or a mixture of both or either with ether, whereupon a precipitate is obtained which, when dried, forms a white or slightly yellow powder. The product is the sodium (or potassium) salt of mono-mercury phthalimid and probably has the following structural formula:

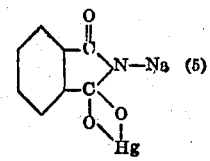

The compound is soluble in water, insoluble in alcohol and does not respond to the ionic test for mercury with caustics such as sodium hydroxide. Analysis of the substance showed a mercury content of 51.10%, while the theoretical amount of mercury present according to formula (5) is 51.97%.

For the preparation of the di-mercury compound, the procedure is the same as for the mono-mercury compound except that two equivalents of mercuric acetate are now used with a corresponding increase in the amount of sodium hydroxide. However, it is usually desirable to take the mono-mercury derivative as the starting point and the mercury acetate added thereto, since by this method the di-mercury compound is usually more readily obtained pure. As an example of a di-mercury compound, potassium di-mercury succinimid has been obtained in accordance with the above procedure by using one mole succinimid instead of the phthalimid mentioned in the above procedure. This compound is also a white water soluble substance, insoluble in alcohol and has probably the following structural formula:

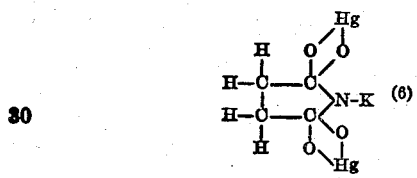

It will be understood that other analogous compounds may be prepared in a similar manner by using other organic compounds containing the carbonyl group and it will also be obvious that other soluble salts of mercury might be used in their preparation instead of mercuric acetate; for example, freshly prepared mercuric oxide may be used in carrying out the reaction but it is preferable to use a soluble salt which, in the presence of an alkali, forms nascent mercuric oxide which reacts with the organic compound present.

From the above description, it will be seen that I have discovered a new series of compounds which may be considered as the mercurial derivatives of organic substances containing the carbonyl group and that these substances are usually obtained as the sodium or potassium salts which are soluble in water, insoluble in alcohol and contain the mercury so combined that they fail to give the ionic test with sodium hydroxide, thus differentiating the substances from a large number of organic mercury compounds previously known to science.

What I claim as my invention is:—

1. A new organic mercury compound which is the reaction product of mercuric oxide with an organic compound containing two or more carbonyl groups, said compound containing the mercury directly linked to one or more of the carbonyl groups according to the formula

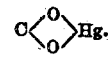

2. A new organic mercury compound which is the reaction product of mercuric oxide with an organic compound having the structure

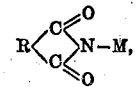

said compound containing the mercury linked to one or more of the carbonyl groups according to the formula

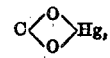

where M is hydrogen, sodium or other metal which can replace hydrogen and R is an organic radical.

3. A new organic mercurial compound represented by the following structural formula:

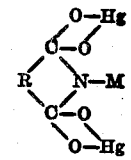

wherein M represents sodium or potassium where R is an organic radical, said compound being a white water-soluble body which does not give the ionic test for mercury with caustics.

4. The process of obtaining organic mercury compounds which consists in treating a solution of an organic compound having the structure

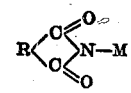

with mercuric oxide and separating from the reaction mixture a compound having the mercury linked to one or more of the carbonyl groups according to the formula

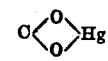

where M is hydrogen, sodium or other metal which can replace hydrogen and R is an organic radical.

5. The process of obtaining organic mercury compounds which consists in forming a water solution of a compound of the type

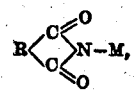

adding excess alkali and a mercuric salt thereto, and separating from the reaction mixture a compound having the formula

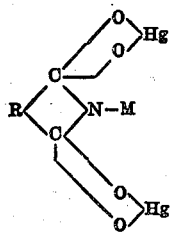

where M is hydrogen, sodium or other metal which can replace hydrogen and R is an organic radical.

6. The process of obtaining organic mercury compounds which consists in treating a solution of an organic imid containing a carbonyl group with a mercuric salt in the presence of excess alkali, and separating from the reaction mixture the alkali salt of an organic mercury compound containing the group

7. A new organic mercury compound containing the following group

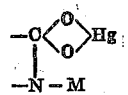

where M is hydrogen, sodium or other metal which can replace hydrogen.

In testimony whereof I affix my signature.

EDWARD LYONS.